Dec. 18, 1923.
H. J. MURRAY
1,478,243
COMBINED MOTOR STARTER AND GEAR SHIFTER
Filed July 15, 1919
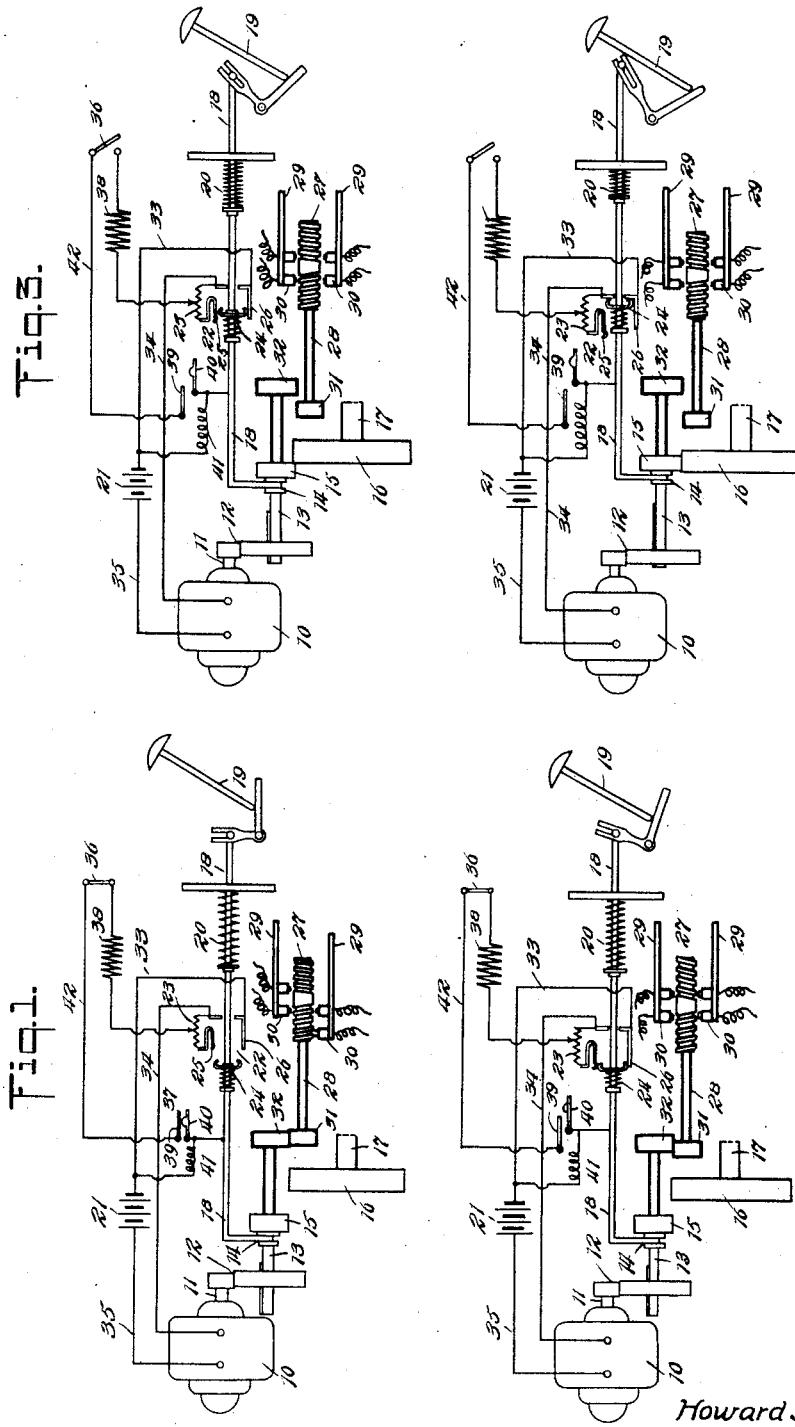
INVENTOR
*Howard J. Murray*
BY
*Warren S. Orton*
ATTORNEY Patented Dec. 18, 1923.

1,478,243

UNITED STATES PATENT OFFICE.

HOWARD J. MURRAY, OF NEW YORK, N. Y.

COMBINED MOTOR STARTER AND GEAR SHIFTER.

Application filed July 15, 1919. Serial No. 311,068.

*To all whom it may concern:*

Be it known that I, HOWARD J. MURRAY, a citizen of the United States, and a resident of the city of New York, county of Kings, and State of New York, have invented certain new and useful Improvements in Combined Motor Starter and Gear Shifter, of which the following is a specification.

My invention relates in general to an improved organization of power elements for actuating a gear shifting mechanism and specifically relates to an improvement in the speed control parts of an automobile power plant.

One of the objects of the invention is to provide a simple and positively actuated means for shifting the gear sets economically and in proper timed sequence to the functioning of corelated mechanism.

In my Patents Nos. 1,268,263; 1,268,264; 1,268,265; 1,268,266; 1,268,267; 1,268,268; 1,268,269 and 1,295,920, it is suggested that the different speed gear combinations be selectively controlled by manual operation and actuated from some suitable power shaft, preferably a rotating shaft, electrically driven. Where economy in construction is paramount it is impractical to provide a separate power plant for actuating the gear shifting mechanism and recourse must be had to such power supplying elements as are already present in the known automobile power plants. Most makes of cars now on the market are equipped with some form of self starter for the engine and this provides a convenient source of power.

The invention therefore primarily contemplates the utilization of such self starters for supplying the power necessary to effect the desired setting of the speed controlling gears. These self starters are usually of the high speed, high torque type of electric motors and include some means actuated manually, mechanically, or electrically for moving its driving power element into driving engagement with some movable element of the engine to start the same. It is usual to permit the motor initially to run idle and until it acquires a momentum sufficient to "turn over the engine." Gears can be shifted rapidly and require relatively small power to effect the shift.

Accordingly the invention in its refinement of application to automobile construction includes a connection between the self starter and the gear shifting mechanism which will be operative during the period in which the motor is building up speed and which will automatically become inoperative as a shifting motor prior to the time when the motor assumes its working load as a starting motor.

Stated differently, an object of the invention is to provide a single power plant which when set in operation will first supply the necessary power to actuate a gear shifting mechanism and will then supply the necessary power to start the engine.

Another object of the invention is to provide a control for the motor which when set in operative position will cause the motor to function to an extent sufficient to shift the gears, preferably at low speed and which will automatically become inoperative when other controls are actuated to couple the motor at high speed to the engine starter. This phase of the invention is attained in the illustrated disclosure by providing two switches for controlling a current supply to the motor through relatively high resistance, one of said switches being normally opened and closed manually when it is desired to shift the gears and the other switch being normally closed and with its movable element connected to the self starter control so that the movement of the self starter control will open said second switch and thus remove the high resistance from the motor circuit.

Various other objects and advantages of the invention will be in part obvious from an inspection of the accompanying drawings and in part will be more fully set forth in the following particular description of one form of mechanism embodying my invention, and the invention also consists in certain new and novel features of construction and combination of parts hereinafter set forth and claimed.

The several figures are diagrammatic representations of conventional parts assembled to illustrate a preferred embodiment of the invention and showing successive stages of the shifting parts, Figure 1 showing one of the gear controlling rods in shifted position and about to be shifted to its neutral position; and Figure 2 showing the completion of the rod shifting movement, the high resistance removed and the motor supplied through relatively low resistance;

Figure 3 is a view showing the connection with the gear shifting mechanism disconnected from the motor; and Figure 4 shows the connection completed between the motor and the engine starter and with all resistance removed from the motor circuit.

In the drawings there is shown a conventional form of engine starter including an electric motor 10, the armature shaft 11 of which is connected through a multiplying gear train 12, with a shiftable driving shaft 13. The shaft is provided with a clutch member 14 for moving the shaft and thus shifting an engine starter driving member 15 into engagement with a flywheel 16 on an engine shaft 17. The clutch includes a reach rod 18 provided with a manually actuated control, such as a pedal 19, and a return spring 20 for resetting the clutch in its inoperative position when relieved of pressure on the pedal.

The motor is supplied from a source of electric energy 21 through a switch 22 arranged so that the actuation of the rod 18 in one direction will first close the circuit through a resistance 23 and when the rod is fully shifted the resistance is cut out of the system. This is attained by mounting the movable element 24 of the switch on the rod 18 and causing it to bridge two contacts 25 and 26, one of which is in two parts with the resistance 23 between the parts.

As thus far described the construction embodies the basic features of numerous well known makes of electric self-starters and if it be assumed that the shaft 13 is an armature shaft designed to be shifted automatically by the increase in motor speed, then the disclosure can represent another known type of self-starter.

Referring to the gear shifting mechanism there is shown a worm type of gear shift including a right and left hand worm 27 rotated by a gear shifting shaft 28 and in turn selectively controlling either of the two gear controlling rods 29 through the instrumentality of the selecting electromagnets 30 as more fully described in my patents above identified.

For the purpose of rotating the shaft 28 from the shaft 13, the shaft 28 is provided with a driven member 31, preferably a gear and the shaft 13 is provided with a driving member 32 such as a gear fashioned to mesh with the gear 31. These gears 31 and 32 are so disposed relative to each other and to the member 15 and its coacting flywheel 16 that when the self starter connection with the shaft 13 is effective, as shown in Figure 4, the connection between the shaft 13 and the gear shifting mechanism is inoperative.

The device is operative as thus far described. Depressing the pedal 19 shifts the rod 18 to the right of the position shown in Figure 1, the switch 22 is closed, the motor started and the drive as effected from the motor through the gear train 12, shaft 13, gear train formed by the gears 31 and 32 and the worm revolved as disclosed in the patents, above identified. The continued movement of the rod to the right will eventually disconnect the gears 31 and 32 and connect the member 15 with the fly-wheel. By this time the switch element 24 has moved past the resistance 23 and the circuit is completed from the source 21 through the conductor 33 which leads to the contact 26, through a conductor 34 which leads from the contact 25 to one side of the motor and then through a conductor 35, which leads from the other side of the motor back to the source.

The showing in the drawings also includes a control for starting the motor slowly through high resistance in the motor circuit and for removing this resistance automatically when the motor is desired to drive the engine. For this purpose the source and motor are wired into a circuit which includes two switches 36 and 37 and a high resistance 38. One of the switches 36 is manually actuated and the other switch 37 includes a relatively stationary contact 39 and a sliding contact 40 carried by the rod 18. One conductor 41 connects the contact 40 with the conductor 33 and another conductor 42 includes the resistance 38 and switch 36 and connects the contact 39 with the conductor 34 preferably at the relatively low resistance 23.

Referring first to Figure 1 and assuming that the switch 36 is closed, the rod 18 in normal position and the desired electromagnet 30 set to effect the required driving gear shifting, and the automobile engine clutch "out", current will pass from the source to the motor, through the switch 37 and through the high resistance. This will cause the motor to revolve at a speed depending upon the resistance in the motor circuit thus formed. The gears are shifted as previously described. In this case the lower rod 29 is moved to the right from the position shown in Figure 1 to the position shown in Figure 2. The circuit may be broken automatically at the termination of the rod shifting movement as suggested in the patents. By this construction it will be apparent that with the switch 36 closed, the motor is running under relatively light torque, due to the resistance in the motor circuit, and the motor is normally connected to the worm 27 to rotate the same.

When the pedal 19 is actuated to shift the rod 18, the movable contact 40 is moved away from its coacting contact 39 thus breaking the motor circuit which includes the high resistance 38. The continued movement of the rod 18 immediately moves the element 24 into position to close the circuit through the switch 22. Current is then passed through the relatively low resistance 23 as shown in Figure 2 and the motor begins to speed up to attain the necessary high torque to actuate the starter mechanism. Finally even this low resistance is cut out of the motor circuit as shown in Figure 4 and as is well known in engine starter mechanism.

By means of a device of this character it is possible to supply power to shift the gears and then start the engine in the proper timed sequence from the starter motor mechanism now in general use.

Having thus described my invention, I claim:—

1. In a device of the class described, the combination with a gear shifting mechanism of means for forming an electric circuit including a resistance and an electric motor normally in operative engagement with the gear shifting mechanism to actuate the same whereby the gears are shifted by means of the motor while acting with a relatively low torque, an engine shaft normally disposed disconnected from the motor, manually actuated means for reducing the resistance in said circuit for intercepting the normal connection of the motor with the gear shifting mechanism, and for connecting the motor to the engine shaft thereby to turn over the engine.

2. In a device of the class described, the combination of a gear shifting mechanism, means normally having relatively low power for actuating said mechanism, said means including an element thereof for increasing the power capacity of said means, an engine and a driving connection between said means and said engine operatively responsive to the moving of said element into its position to increase the power capacity of said means.

3. In a device of the class described, the combination with a gear shifting mechanism, and an engine, of an electric motor normally connected to said mechanism and adapted to have its torque characteristics varied at will, means for connecting the motor to the engine and manually actuated means movable in one direction successively to increase the torque of the motor, to interrupt the connection of the gear shifting mechanism with the motor and finally to connect the motor to the engine.

4. In a device of the class described, the combination with an engine and a gear shifting device, a motor to start the engine and to actuate the shifting device, means for forming an electric circuit including said motor, and a control switch and manually controlled means operable in one direction successively to effect a change in the previous status of the switch thereby to modify the operativeness of the motor and then disconnect the motor from the engine.

5. In a device of the class described, the combination with a gear shifting mechanism, an engine, means for forming an electric circuit including a motor for directly actuating either the mechanism or the engine, a control switch, manually actuated means for controlling the engagement of the motor at will with either the gear shifting mechanism or with the engine and means acting on said last named means for opening the switch and simultaneously disconnecting the motor from its driving connection with the engine.

6. In a device of the class described, the combination of means for forming an electric circuit including a motor, a switch, a manually actuated reach rod for moving the switch into its circuit opening and closing positions, a gear shifting member and an engine shaft, a clutch member carried by the reach rod for selectively connecting the motor at will with either the gear shifting member or the engine and resilient means acting on the reach rod for automatically moving said switch into its circuit opening position and for restoring the connection between the motor and gear shifting mechanism on the release of manual tension on the reach rod.

7. In a device of the class described, the combination of a motor normally inactive, initially acting through relatively slow starting speeds, a gear shifting device normally connected to the motor and actuated thereby at the relatively slow starting motor speeds, an engine shaft provided with means for connecting the same to the motor to be driven at relatively high motor speeds and means for successively closing the motor circuit, disconnecting the gear shifting device from the motor and connecting the engine shaft with the motor.

8. In a device of the class described, the combination with a power member, a gear shifting mechanism and a driven device, of means for selectively coupling the power member in direct driving relation either with the gear shifting mechanism or with the driven device and means acting on said last named means and tending to interrupt the driving connection between the power member and said driven device and to restore the driving connection between the power member and the gear shifting mechanism.

9. In a device of the class described, the combination with an organization of elements to form an electric circuit, said elements including in series a source of electric energy, a motor, a switch and an electric resistance, of a power transmitting member driven from said motor, a control for said transmitting member having the movable element of said switch operatively connected thereto whereby the actuation of said control will affect current strength through the motor circuit which includes said resistance, a gear shifting mechanism and an element of an engine and means actuated by said control in its movement to cut out the resistance, to disconnect said gear shifting mechanism from said power transmitting member and to connect the power transmitting member to the engine.

10. In a device of the class described, the combination with an organization of elements to form an electric circuit, said elements including in series a source of electric energy, a motor, a switch and an electric resistance controlled by said switch, of a power transmitting member driven from said motor, a control for said transmitting member having the movable element of said switch operatively connected thereto whereby the actuation of said control will affect current strength through the motor circuit which includes said resistance, a gear shifting mechanism, means actuated by said control for connecting said gear shifting mechanism to said power transmitting member and means acting on said switch to return the same to its normal position.

11. In a device of the class described, the combination with an organization of elements to form an electric motor circuit, said elements including a source of electric energy, a motor, a relatively high resistance, a switch for controlling said high resistance, a relatively low resistance and a second switch for controlling said relatively low resistance, of a power transmitting member driven from said motor, a control for said transmitting member, the movable elements of each of said switches being operatively connected to said control whereby the movement of the control in one direction will affect first one of the resistances and then the other resistance in the motor circuit, a gear shifting mechanism and means actuated by said control for affecting the driving connection between the motor and said gear shifting mechanism.

12. In a device of the class described, the combination with an organization of elements to form an electric motor circuit, said elements including a source of electric energy, a motor, a relatively high resistance, a switch for controlling said high resistance, a relatively low resistance and a second switch for controlling said relatively low resistance, of a power transmitting member driven from said motor, a control for said transmitting member, the movable elements of each of said switches being operatively connected to said control whereby the movement of the control in one direction will affect first one of the resistances and then the other resistance in the motor circuit, a gear shifting mechanism, means for connecting said mechanism with the power transmitting member, a driven shaft and means actuated by said control for selectively affecting the driving connections between the driven shaft or the gear shifting mechanism and said power transmitting member.

13. In a device of the class described, the combination of a high speed electric motor, adapted normally to drive at high speed, a gear shifting mechanism, means for connecting said mechanism with the motor to be driven thereby, means operatively associated with said connecting means for introducing high resistance into the motor circuit to cause the motor to run at relatively slow speed during the actuation of the gear shifting mechanism, means for removing the high resistance from the motor circuit thereby to permit it to drive at normal speed and mechanism operatively connected to the motor when functioning at its normal high speed.

14. In a device of the class described, the combination with a device which requires high torque power to actuate the same, of a high speed electric motor, adapted normally to drive said device at high torque, a gear shifting mechanism, a clutch for connecting said mechanism with the motor to be driven thereby, means for introducing high resistance into the motor circuit to cause the motor to run at relatively slow speed while actuating the gear shifting mechanism, and means controlled by said first named means for removing the high resistance from the motor circuit and for connecting said motor with said high torque device.

15. In a device of the class described, the combination of a high speed electric motor, adapted normally to drive at high speed, a gear shifting mechanism, means for connecting said mechanism with the motor to be driven thereby, means normally disposed to position high resistance into the motor circuit to cause the motor to run at relatively slow speed while actuating the gear shifting mechanism, means controlled by said second named means for temporarily removing the high resistance from the motor circuit means controlled by said second named means for temporarily introducing relatively low resistance into the motor circuit, an engine and a reducing gear connection between the motor and engine.

16. In a device of the class described, the combination of a device which requires a relatively high torque effect to cause it to function, of a high speed electric motor adapted to be connected to said device and normally designed to drive at high speed and thus supply the necessary torque forces to cause the device to function, a gear shifting mechanism, means for connecting said mechanism with the motor to be driven thereby, means for introducing high resistance into the motor circuit to cause the motor to run at relatively slow speed while actuating the gear shifting mechanism and means controlled by said second named means for removing the high resistance from the motor circuit and means controlled by said second named means for introducing relatively low resistance into the motor circuit for a period of time and removing the low resistance from the motor circuit whereby the motor is permitted to build up speed after the gear shifting mechanism has functioned and before the motor is connected to the high torque device.

17. In a device of the class described, the combination of a high speed electric motor, adapted normally to drive at high speed, a high torque device, a gear shifting mechanism, means for connecting said mechanism with the motor to be driven thereby, means for introducing high resistance into the motor circuit to cause the motor to run at relatively slow speed while actuating the gear shifting mechanism, means controlled by said second named means for removing the high resistance from the motor circuit, means controlled by said second named means for introducing relatively low resistance into the motor circuit for a period of time and removing the low resistance from the motor circuit whereby the motor is permitted to build up speed after the gear shifting mechanism has functioned and before the motor is connected to the high torque device and means for connecting the motor with said high torque.

18. In a device of the class described, the combination of a high speed electric motor, a reducing gear train driven thereby, a gear shifting mechanism, an engine shaft, a gear drive adapted to connect the reducing gear train with the shifting mechanism to drive the same at one speed relative to the motor speed, a second gear drive adapted to connect the reducing gear train with the engine shaft to drive the same at a speed different from the speed of the shifting mechanism and a single manually actuated means for moving both of said gear drives to and from their operative positions.

19. The combination with an engine shaft, a gear shifting mechanism, a motor, and means for operatively connecting said motor either to said engine shaft or to said gear shifting mechanism, of means controlled by said connecting means for changing the torque characteristic of the motor in a preset timed relation with the connection thereof with the engine shaft and with the gear shifting mechanism.

20. In a device of the class described, the combination with an engine shaft, a gear shifter mechanism, an electric motor normally inactive and in driving relation with the gear shifter mechanism and manually actuated control means operatively connected during its initial movement to inaugurate the actuation of said motor, and then in succession to disconnect the motor from the mechanism and connect the same to the engine shaft whereby the gear shifting mechanism may be actuated by the motor during the period while it is building up its speed and the succeeding movements of the control means will disconnect the motor from the gear shifting mechanism and then connect the speeding motor with the engine shaft.

21. In a device of the class described, the combination with an engine shaft, a gear shifter mechanism, power means having capacity to act under two torque values, a two position driving connection, in one position connecting the power means with the gear shifter mechanism and in the other position connecting the power means with the engine shaft, and a manually actuated control operatively connected with the driving connection and with the power means to connect the power means with the gear shifter mechanism when the power means is active under its relatively low torque and to connect the power means with the engine shaft when the power means is active under its relatively high torque.

22. In a device of the class described, the combination with an engine, a starter therefor normally in an inoperative relation thereto, a gear shifter mechanism normally in operative relation to the starter to be actuated thereby promptly on the inauguration of the starter operation and a control for disconnecting the starter from the shifter mechanism and for connecting the active starter in operative relation to the engine.

23. In a device of the class described, the combination with an engine, a starter therefor including an electric motor having a resistance in the motor circuit, said starter being normally in an inoperative position relative to the engine, a gear shifting mechanism adapted to be actuated by said motor, and a manually actuated control adapted to disconnect the motor from the shifting mechanism, to remove resistance from the motor circuit and to connect the starter with the engine in the sequence named.

24. In a device of the class described, the combination with an engine, a starter therefor including an electric motor having a resistance in the motor circuit, said starter being normally in an inoperative position relative to the engine, a gear shifting mechanism adapted to be actuated by said motor, a manually actuated control adapted to disconnect the motor from the shifting mechanism to remove resistance from the motor circuit and to connect the starter with the engine in the sequence named and means operatively responsive to the release of the manually actuated means for automatically introducing the resistance into the motor circuit and for interrupting the operative engagement of the starter with the engine.

Signed at New York city in the county of New York and State of New York this 10th day of July, A. D. 1919.

HOWARD J. MURRAY.